United States Patent
Veach

(10) Patent No.: US 6,707,452 B1
(45) Date of Patent: Mar. 16, 2004

(54) METHOD AND APPARATUS FOR SURFACE APPROXIMATION WITHOUT CRACKS

(75) Inventor: Eric Veach, Redwood City, CA (US)

(73) Assignee: Pixar, Emeryville, CA (US)

( * ) Notice: Subject to any disclaimer, the term of this patent is extended or adjusted under 35 U.S.C. 154(b) by 143 days.

(21) Appl. No.: 09/619,065

(22) Filed: Jul. 19, 2000

(51) Int. Cl.⁷ .............................................. G06T 17/20
(52) U.S. Cl. ...................... 345/423; 345/421; 345/581; 345/606
(58) Field of Search ................... 345/420, 419, 345/423, 421, 428, 443, 427, 442, 581, 606

(56) References Cited

U.S. PATENT DOCUMENTS

| | | | |
|---|---|---|---|
| 5,278,949 A | * | 1/1994 | Thayer .................. 345/419 |
| 5,377,320 A | * | 12/1994 | Abi-Ezzi et al. ............ 345/419 |
| 6,313,837 B1 | * | 11/2001 | Assa et al. .................. 345/420 |
| 6,373,489 B1 | * | 4/2002 | Lu et al. .................... 345/420 |

* cited by examiner

Primary Examiner—Mark Zimmerman
Assistant Examiner—Kimbinh T. Nguyen
(74) Attorney, Agent, or Firm—Townsend and Townsend and Crew LLP

(57) ABSTRACT

A method and apparatus for surface approximation without cracks. In one or more embodiments, a surface to be rendered is split into multiple adjacent regions (e.g., subdivision surfaces or patches). A data structure is associated with each boundary edge between two regions for storage of adjacency information in the form of a sequence of tessellation vertices. Adjacency information for a given edge is written into the data structure when an adjacent region is first tessellated. When the remaining adjacent region is tessellated, the adjacency information is read from the data structure and used to achieve tessellation without cracks. In one embodiment, visible cracks due to T-vertices are prevented by forming an overlap of adjacent regions at the location of each T-vertex. This technique allows regions to be tessellated and rendered without any advance knowledge of how the adjacent regions will be split. The regions may be tessellated and rendered separately and in any order, reducing time and memory requirments for rendering.

18 Claims, 14 Drawing Sheets

METHOD AND APPARATUS FOR SURFACE APPROXIMATION WITHOUT CRACKS

BACKGROUND OF THE INVENTION

1. Field of the Invention

This invention relates to the field of computer graphics, and, more specifically, to graphical rendering of surfaces.

2. Background Art

In computer graphics, images are often created from three-dimensional objects modeled within a computer. The process of transforming the three-dimensional object data within the computer into viewable images is referred to as rendering. Typically, objects are modeled as one or more surfaces. Ideally, these surfaces comprise continuous curves for best visual realism. However, in practice, these surfaces are approximated with a mesh of less complex surface components, such as parametric surfaces or patches, to reduce the computational complexity of the rendering process. These patches are further subdivided or "diced" into triangles or polygons for rendering purposes. For example, bicubic patches are often rendered by subdividing their parameter space into rectangular grid of quadrilaterals, which are then further subdivided into triangles for rendering. A higher dicing rate provides greater modeling resolution and a better surface approximation. The dicing rate of a given patch may depend on factors such as the distance of the patch from the viewing plane and the local feature complexity of the patch.

An undesirable phenomenon known as "cracking" occurs when surfaces are split into multiple patches that are rendered independently. The shared boundaries between patches are tessellated and displaced by each side independently, which often creates narrow gaps or "cracks" between the two sides. Adjacent patches can compute different positions for their shared boundary curve for several reasons:

- Two adjacent patches may dice at different rates, generating different numbers of vertices along a shared edge.
- The adjacent patches may compute different positions for a vertex at the same parametric location, due to numerical errors. For example, this can occur if one patch has split into two pieces along the adjacent edge while the other patch has not.
- Vertices along a shared edge may have different positions in the two patches due to displacement mapping (a technique whereby the diced vertex positions are modified according to a given formula, such as a texture map lookup, in order to add geometric detail to a smooth underlying surface). For example, this can happen when finite difference techniques are used in the displacement calculations (to estimate surface normals, derivatives, or texture filtering information). This is because finite difference techniques cause the position of a vertex to depend on the position of its neighbors, which are different in the two patch tessellations.

An example of crack formation is illustrated in FIGS. 1A and 1B. FIG. 1A depicts an idealized surface comprising regions 100 and 101, having a continuous seam 102 between the regions. FIG. 1B depicts an approximation of the surface of FIG. 1A, wherein region 100 is now 100A comprising several parametric surfaces with piecewise linear edge 102A corresponding to seam 102. Similarly, region 101A comprises several parametric surfaces having piecewise linear edge 102B corresponding to seam 102. Edge 102A models seam 102 with a higher dicing rate than edge 102B. As shown, edge 102A contains four vertices within the same span in which edge 102B has three vertices. The mismatch in dicing rates as well as the displacement differences between vertices in edges 102A and 102B form a crack 103 between regions 100A and 101A. Crack 103 represents a rendering error that may be visually apparent in the final rendered image, particularly where there is high contrast between the color value associated with regions 100B and 101B and the color value associated with the background visible through the crack.

Previous techniques for eliminating cracks fall into several categories. First there are methods that render parametric surfaces as a restricted quad-tree. That is, tessellation is limited to a pattern of quadrilaterals wherein the variation in dicing rates between patches is strictly constrained. These techniques store the entire tessellated surface in memory and do not support surfaces of arbitrary topology.

A second set of techniques are based on the idea that the tessellation of a boundary should be based only on the boundary curve itself. However, these methods do not eliminate all sources of cracking. In particular, if the patches on one side of a shared boundary have split more often than those on the other, then there is no single dicing rate for the unsplit patch that can match the multiple rates on the other side. Furthermore these techniques cannot handle the problems caused by displacement mapping, in which case the two sides can have different vertex positions even if the dicing rates match.

In another variation, the boundary curves are tessellated before patches are split. This technique has several drawbacks. It generates highly irregular tessellations that cannot be evaluated efficiently; it requires a substantial amount of time and memory to split patches that may eventually be occluded (and discarded) anyway; and, furthermore, this technique cannot render patches whose boundaries are simple (e.g. flat) but have complex features in their interiors.

Finally, some prior art techniques are based on the idea of splitting all patches and determining dicing rates in a pre-processing phase. For each portion of a shared boundary edge, one of the two adjacent patches is arbitrarily chosen to be associated with that edge. The main drawback to this approach is that the entire surface must be tessellated (or at least all dicing rates must be determined) in advance, which has significant time and memory expenses.

SUMMARY OF THE INVENTION

A method and apparatus for surface approximation without cracks are described. Embodiments of the invention may be applied to surfaces of arbitrary topology. In one or more embodiments, a surface to be rendered is split into multiple adjacent regions (e.g., subdivision surfaces or patches). A data structure is associated with each boundary edge between two regions for storage of adjacency information in the form of a sequence of tessellation vertices. Adjacency information for a given edge is written into the data structure when an adjacent region is first tessellated. When the remaining adjacent region is tessellated, the adjacency information is read from the data structure and used to achieve tessellation without cracks. In one embodiment, visible cracks due to T-vertices are prevented by forming an overlap of adjacent regions at the location of each T-vertex. This technique allows regions to be tessellated and rendered without any advance knowledge of how the adjacent regions will be split. The regions may be tessellated and rendered separately and in any order, reducing time and memory requirements for rendering.

In one embodiment, the data structure is implemented as a binary tree having a root node created when a new edge is created through a splitting operation. Splitting of an existing edge results in the creation of two child nodes corresponding to the new edge segments. Nodes may be freed from memory when no longer referenced by either of the associated adjacent regions.

DETAILED DESCRIPTION OF THE INVENTION

The invention is a method and apparatus for surface approximation without cracks. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

In one or more embodiments of the invention, a data structure mechanism is provided for maintaining adjacency information for boundaries between regions of a surface. Those regions may be, for example, subdivision surfaces, patches or even two independently modeled surfaces that a designer now wishes to combine. The adjacency information is written by the first adjacent region to be rendered into a data structure associated with a given edge of the region. When the opposing region is subsequently rendered, a tessellation process utilizes the stored adjacency information to achieve a seamless rendering without cracks. Regions of a surface may thus be individually split and rendered independently of one another, reducing processing and memory requirements while providing desired visual performance.

Figure 1A:
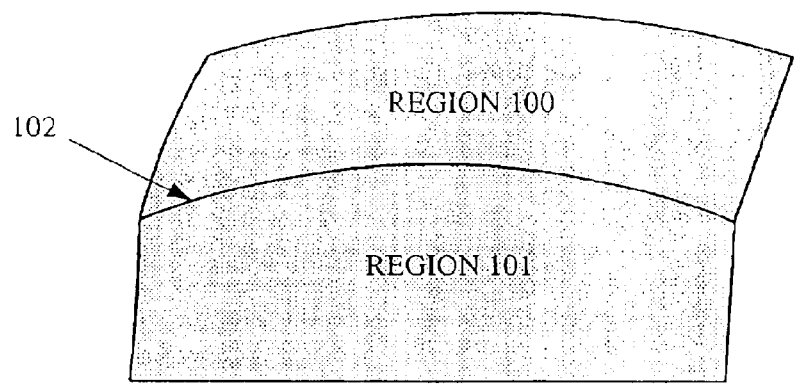
FIG. 1A illustrates a boundary between two regions of a continuous surface.
Figure 1B:
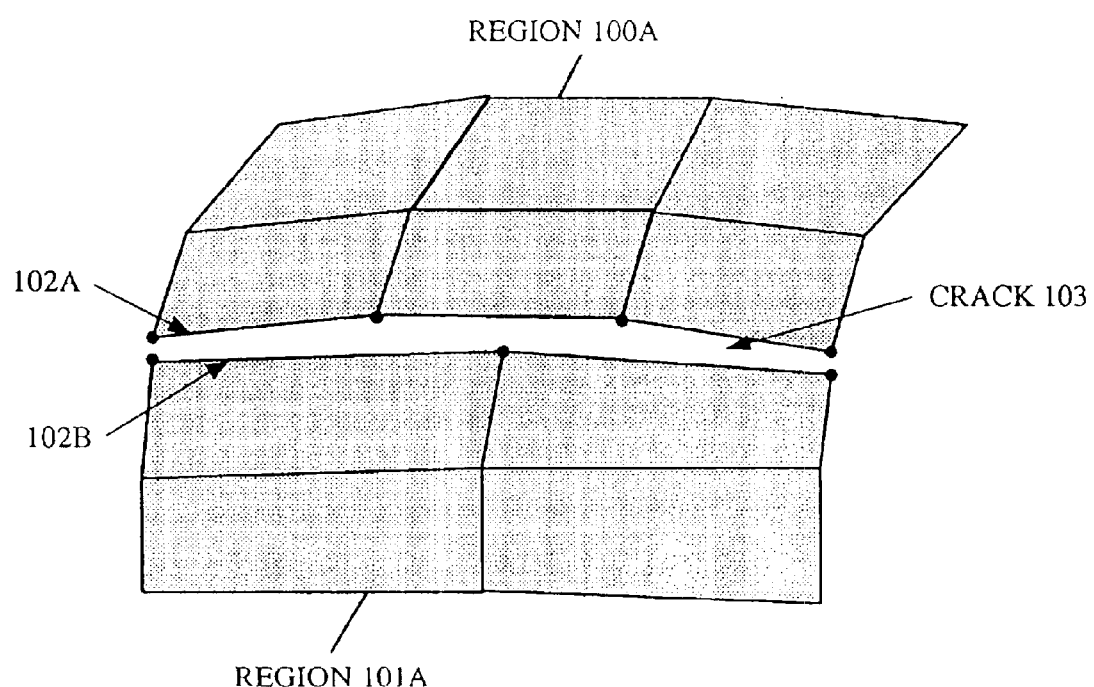
FIG. 1B illustrates a crack formed at the boundary between two polygonal regions of a surface.
Figure 2:
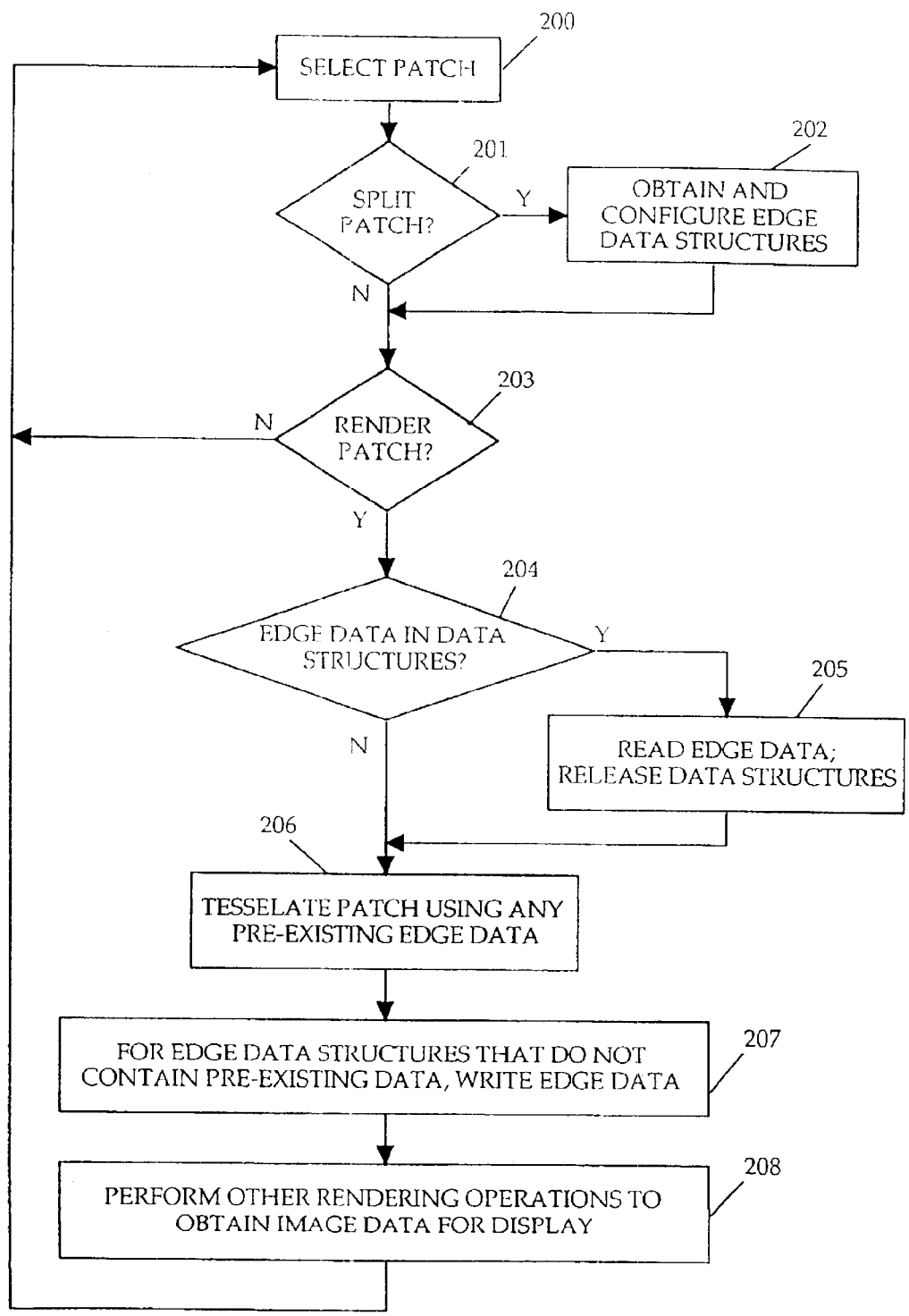
FIG. 2 is a flow diagram of a method for processing patches in accordance with an embodiment of the invention.

FIG. 2 is a flow diagram illustrating a method for independently processing patches in accordance with one or more embodiments of the invention. Whereas prior art techniques maintain entire surfaces within memory during rendering operations, the following method facilitates rendering operations for which only a currently selected patch is stored in memory. Furthermore, splitting and rendering operations may be performed without reference to the rendering of any other patch, permitting a patch to be freely split as many times as desired before committing to a rendering operation.

In step 200 of FIG. 2, a patch is selected for processing. The selected patch may be any patch associated with a given surface. In step 201, the process branches depending on whether the rendering application has selected a patch splitting operation or not. If a patch splitting operation is selected, in step 202, data structures are allocated and configured in association with those edges of the patch that are created or modified by the split. After step 202, or after step 201 if no splitting operation was selected, the process branches in step 203 depending on whether the rendering application has selected a rendering operation for the patch. If no rendering operation is selected, the process return to step 200 where another patch may be selected for processing.

If, in step 203, a rendering operation is selected, then, in step 204, the process determines whether adjacency information in the form of pre-existing edge data is available in the data structures associated with the edges of the currently selected patch. Such data would be stored from a previously rendered adjacent patch. Note that since each edge is stored as a binary tree, there may be pre-existing data only on certain subintervals of the edge. This occurs when the adjacent patch has been split into several subpatches, only some of which have been previously rendered. If there is pre-existing edge data, in step 205, the edge data is read and the associated data structures are freed from memory before proceeding to step 206. If no pre-existing edge data is available in step 204, the process continues to step 206. In step 206, the current patch is tessellated using any pre-existing edge data read in step 205. In step 207, for those associated edge data structures or subintervals thereof (subedges) that do not contain pre-existing edge data, the edge data from the tessellation process of step 206 is written into the data structures. In step 208, the process may perform additional rendering operations upon the tessellated patch to obtain image data (e.g., shading, texture mapping, etc.). After step 208, the process returns to step 200 where another patch may be selected for processing.

More detailed description is provided below with respect to an implementation of edge data structures for storing adjacency information. Following the discussion of the edge data structure implementation, a tessellation method that utilizes the adjacency information will be described.

Maintaining Adjacency Information for Split Regions

Embodiments of the invention implement an edge data structure (referred to herein as a "StitchEdge") that represents the shared boundary of two patches or regions. The edge data structure acts as a repository for boundary data from the adjacent patches. Each patch has one pointer for every edge. For example, a quadrilateral patch has four edge pointers. Some of these pointers may be NULL, to indicate that there is no adjacent patch on that side.

Each edge has a binary tree structure, to allow one patch to be adjacent to several other patches (e.g., due to varying amounts of splitting on each side). An edge can be thought of as a piecewise linear function defined over a set of parameter intervals. When an edge is first created, it has a parameter range of [0, 1]. Each internal node in the binary tree splits this parametric domain into two subintervals (often of equal length). At leaf nodes, the piecewise linear function is defined by a sequence of vertices in increasing parametric order (representing a set of linear segments). The parameter values associated with these vertices must span the interval [lo, hi] associated with the edge. Note that the vertex data is not typically allocated until one of the adjacent patches has been rendered. Thus a NULL data pointer indicates that the function is not yet defined over this interval.

The following is one possible implementation of an edge data structure in accordance with an embodiment of the invention:

```
struct StitchEdge (
    float lo, hi;         /* the parameter range for this edge */
    StitchEdge *child[2];/* the children (NULL for leaf nodes) */
    StitchData *data;     /* edge data (NULL for internal nodes) */
);
struct StitchData (
    int n;                /* number of data points */
    Stitchpoint p[];      /* the points (increasing parametric order) */
);
struct Stitchpoint (
    float t;       /* edge parameter value */
    Point pos;     /* vertex position */
    ...            /* other vertex data (as desired) */
);
```

The StitchEdge data structure comprises two floating point values, "lo" and "hi", for specifying the beginning and ending values for the parameter range embodied in the given edge. StitchEdge also comprises two pointers to StitchEdge data structures representing children of the current data structure, and a pointer to a StitchData data structure. The StitchData data structure contains the adjacency information associated with the current edge, that information being represented as an array (or sequence) of StitchPoint data structures in increasing parametric order. An integer "n" is used to specify the number of StitchPoint structures in the array. The StitchPoint data structure itself may comprise a floating point parameter value "t" associated with the given StitchPoint (i.e., vertex), as well as a position value "pos" of type Point. Other vertex data may also be associated with the StitchPoint data structure.

During splitting of regions, there are three main operations involving the edge data structure: create a new edge, split an existing edge and cull an existing edge whose references are gone. New edge data structures are created whenever a splitting operation results in a new edge. The new edge data structure has two references to it, one for each of the adjacent regions. When a new edge is created, the new edge may effectively split an existing edge (e.g., by bisecting the existing edge). Splitting an edge returns two children data structures and dereferences the parent, with each new patch set to point to the appropriate half of each split edge. Each edge can be split at most twice (once for each patch that is adjacent to it).

Edge data structures are dereferenced (i.e., one of the adjacent patches no longer points to it) after the edge is split or after the respective patch has either written to or read from the data structure in a tessellation procedure. Once an edge data structure is no longer referenced by any patch, the edge may be culled, i.e., the edge may be freed from memory.

Figure 3:
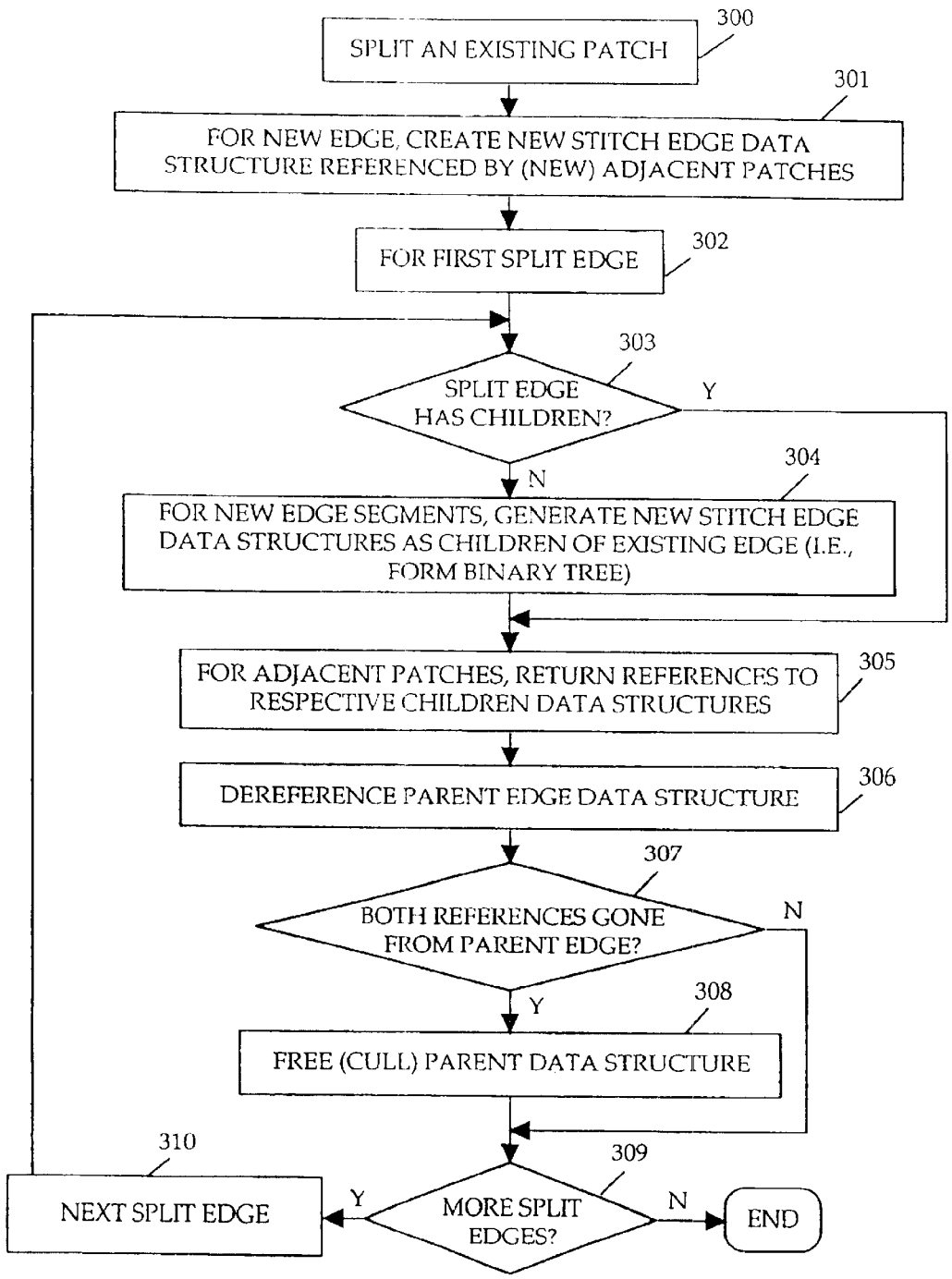
FIG. 3 is a flow diagram of a process for splitting a surface into multiple regions, in accordance with an embodiment of the invention.

FIG. 3 is a flow diagram illustrating a patch splitting process in accordance with an embodiment of the invention. In step 300, an existing surface, patch or other region is split into two patches. In step 301, a new edge data structure is associated with the new patch boundary edge introduced by the splitting operation. The new edge data structure is referenced by both new patches. In step 302, an existing edge split by the new patch boundary is identified as a split edge. In step 302, if the split edge has associated child edge data structures associated with it, the process continues at step 305; otherwise, at step 304, for each new edge segment, a new edge data structure is created as a child of the existing edge data structure, forming a binary tree. Step 304 continues to step 305, in which references to the child edge data structures are passed to the respective adjacent patches.

In step 306, the parent edge data structure is dereferenced with respect to the split patch. If, in step 307, the parent edge data structure is no longer referenced, the parent edge data structure may be freed from memory (i.e., culled) in step 308; otherwise, the process continues at step 309. In step 309, if more split edges remain to be processed, the next split edge is identified in step 310 and the process returns to step 303; otherwise, the process is complete.

Figure 4A:
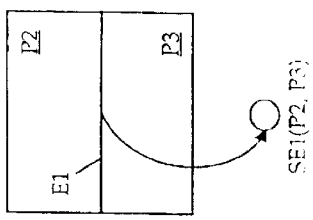
FIGS. 4A–4D are diagrams illustrating a surface and the corresponding edge data structure during a splitting operation, in accordance with an embodiment of the invention.
Figure 4B:
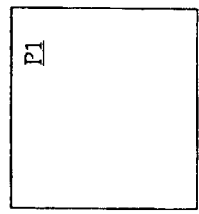
Figure 4C:
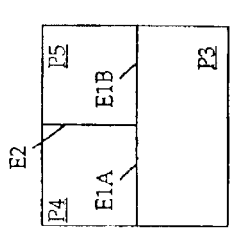

An example of the application of the process of FIG. 3 is shown in FIGS. 4A–4D. FIG. 4A shows an isolated patch (or surface) P1 prior to any splitting. In FIG. 4B, patch P1 has split into two smaller patches P2 and P3 by virtue of new edge E1. A new edge data structure SE1 is created to represent the boundary E1, and the edge pointers of patches P2 and P3 are updated to point to SE1. In FIG. 4C, patch P2 is further split by edge E2 into two new patches P4 and P5, with edge E1 splitting into two subedges E1A and E1B. As a result, new edge data structures SE1A and SE1B are created as children of data structure SE1, such that SE1, SE1A and SE1B form a binary tree. Patch P3 still points to the root edge data structure SE1, while patches P4 and P5 are updated to point to the child data structures SE1A and SE1B, respectively. Further, a new edge data structure SE2 is created in connection with edge E2, and is referenced by patches P4 and P5.

Figure 4D:
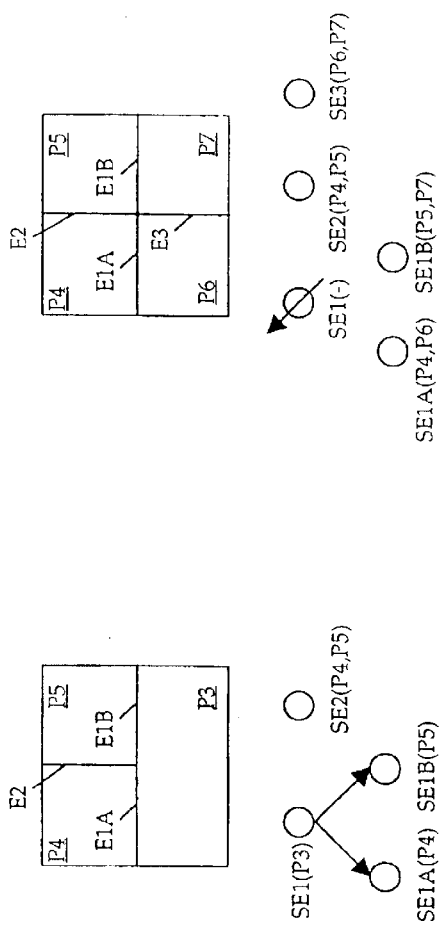

In FIG. 4D, edge E3 splits patch P3 into new patches P6 and P7. As a result, a new edge data structure SE3 is created, which is referenced by patches P6 and P7. Patches P6 and P7 also obtain pointers to data structures SE1A and SE1B, respectively, after which the parent edge data structure SE1 is freed. Thus as patches split, one edge data structure can divide into several independent pieces. This convention simplifies memory management.

The foregoing discussion describes how a binary tree data structure may be used to maintain adjacency information as regions of a surface are split. The following is a description of how that adjacency information may be utilized to provide a tessellation of a surface without cracks in accordance with one or more embodiments of the invention.

Tessellation Without Cracks

In one or more embodiments of the invention, as each patch is tessellated, the tessellation vertices must conform to any boundary data that is contained in the adjacent edges. Once the patch is rendered, its boundary data is then written in turn to any adjacent edges or portions thereof (subedges) that did not previously have data.

Figure 5A:
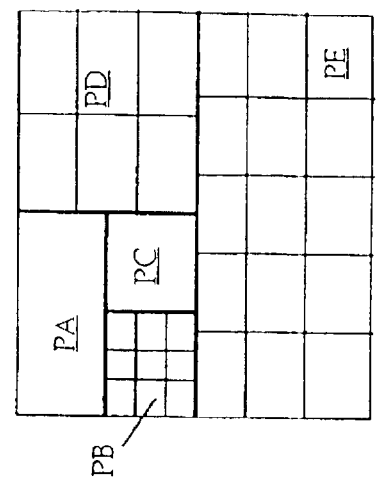
FIGS. 5A–5C are diagrams illustrating a surface and the corresponding edge data structure during a tessellation operation, in accordance with an embodiment of the invention.
Figure 5A:
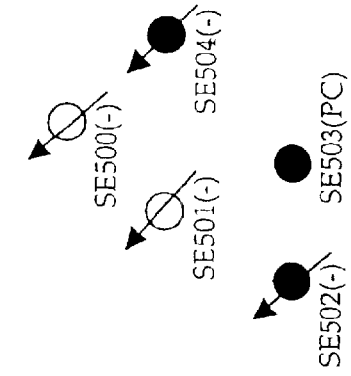

FIGS. 5A–5D illustrate handling of edge data structures during tessellation of patches in accordance with an embodiment of the invention. In FIG. 5A, a surface has been split into patches PA–PE, where PE occupies the lower half of the surface, PD occupies the upper right quadrant, PA occupies the upper half of the upper left quadrant, PB occupies the lower left quarter of the upper left quadrant and PC occupies the lower right quarter of the upper left quadrant. The focus of this example is the upper boundary of patch PE, which is also the lower boundary for patches PB–PD.

For the subject boundary, the progression of edge splitting is as follows. Edge E500 (spanning the upper boundary of patch PE) is defined and a corresponding root edge data structure SE500 is created (e.g., as an instance of StitchEdge). Edge E500 is split into edge E501 (spanning the lower boundary of patches PB and PC) and edge E504 (spanning the lower boundary of patch PD), resulting in the creation of respective child data structures SE501 and SE504. Edge E501 is further split into edges E502 (the lower boundary of patch PB) and E503 (the lower boundary of patch PC), resulting in the creation of respective edge data structures SE502 and SE503 as children of SE501.

Though it is not necessary that all patches be split before any patches are diced and/or rendered, this example will assume that such is the case for simplicity. With all splitting concluded, the binary tree formed by data structures SE500–SE503 is referenced as follows: SE500 is referenced by patch PE; SE501 is referenced by SE500; SE502 is referenced by SE501 and patch PB; SE503 is referenced by SE501 and patch PC; and SE504 is referenced by SE500 and patch PD. Prior to rendering of any of patches PB–PE, data structures SE500–SE504 contain no edge data (empty circles denote nodes without data).

Figure 5B:
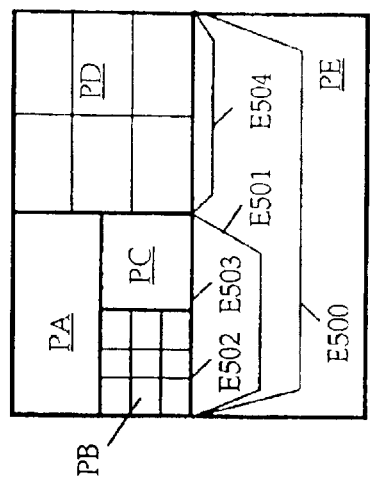
Figure 5B:
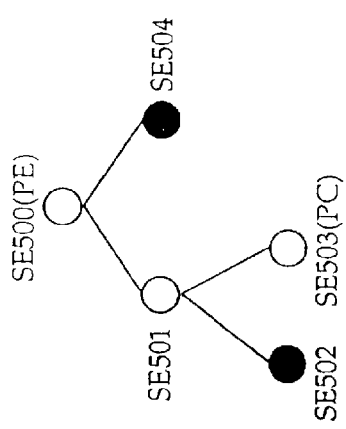

FIG. 5B illustrates the configuration of FIG. 5A after tessellation (and rendering, if desired) of patches PB and PD. Assume that patch PB is rendered first, and is diced into a 3×3 grid of quadrilaterals. Since there is no data in the surrounding edge data structures (including SE502), the nine quadrilaterals in the grid may be rendered directly (or split further into triangles if desired). The boundary data for the lower edge of patch PB is then written into edge data structure SE502 (black circles denote leaf nodes that contain data). The boundary data may comprise, for example, the bottom vertices (as well as the associated parameter values and any other desired vertex data) of the third row of quadrilaterals in the grid. With rendering complete, edge data structure SE502 is dereferenced with respect to patch PB. Similarly, assuming that patch PD is rendered as a 2×3 grid of quadrilaterals, the boundary data from the lower vertices of the bottom row of quadrilaterals is written to edge data structure SE504. Edge data structure SE504 is then dereferenced with respect to patch PD.

Figure 5C:
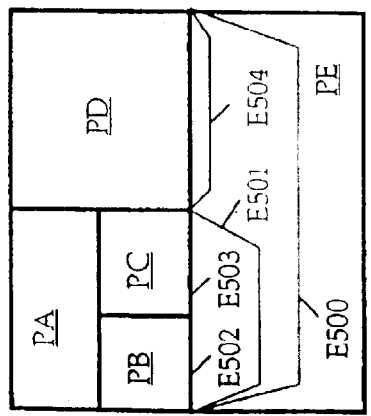
Figure 5C:
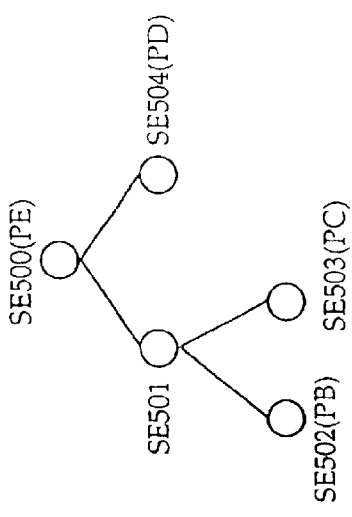

In subsequent FIG. 5C, patch PE is diced as a 5×3 grid of quadrilaterals. In this case, the adjacent edge data structure SE500 is partially filled with data from previous patches (PB and PD). In accordance with one or more embodiments of the invention, the tessellation of patch PE is modified along edges E502 and E504 to conform to this data. A method for performing such modified tessellation will be described later in this specification.

Finally, the boundary data for patch PE is written to the adjacent edges that did not already contain data (in this case the leaf node SE503, as shown in FIG. 5C). The leaf nodes that already contained data, as well as all of the internal nodes, are freed (since only patch PE refers to them, and patch PE has already obtained the data). This technique of freeing edge data structures simplifies memory management, since reference counting is not required. Instead edges are always in one of two states, depending on whether they contain data or not. When a patch is rendered, each associated edge is either written (if it had no data), or else the edge is read and then freed.

An important side effect of writing the edge data is that the endpoints of existing edges are propagated to their neighbors. For example, when writing the data to leaf edge SE503, the first data point will be the right endpoint of edge SE502, and the last data point will be the left endpoint of edge SE504. Any remaining data points are obtained from the original tessellation of patch PE. This ensures that when patch PC is eventually rendered, its corner vertices will match the adjacent patches PB and PD.

If an edge is split after its data has already been written, then the data contained in the edge is split as well. Each child edge receives all of the parent vertices that are contained within its respective open parameter interval, plus one additional point on each side (which may be outside the interval associated with the child edge).

The Tessellation Method

The embodiment of the tessellation method described herein has two variations, depending on whether T-vertices are allowable. T-vertices refer to those situations in which the corner vertices of two (or more) regions abut a third region along an edge where no corresponding vertex exists (forming a "T" shaped edge alignment). T-vertices are prone to cracks because the vertices often do not align satisfactorily with the edge of the third region. A mechanism for avoiding such cracks will be described later in this specification.

The advantage of allowing T-vertices is that each patch can be diced into a regular grid of vertices. This can simplify the shading process (which determines each vertex color) and allows finite difference techniques to be used. It is undesirable to compute the vertex colors on a regular grid and then interpolate these colors to new positions along the boundary, since this results in significant blurring of the original color data.

In general, tessellation may be accomplished by placing an initial pattern of primitives (i.e., polygons), onto the patch in accordance with a preferred dicing arrangement (e.g., a grid of quadrilaterals). For each primitive in the initial pattern generated for the patch, a triangle fan (or a quadrilateral fan if desired) is generated that incorporates all boundary data stored in the StitchEdge structures for any adjacent edges. This is done by starting at an arbitrary corner vertex, and generating a sequence of vertices in clockwise order around the perimeter of the primitive. This may be done as follows:

For each vertex of the primitive, determine if that vertex is adjacent to any boundary edges of the patch. For each such adjacent edge, determine whether the edge contains any data corresponding to the parameter value of that vertex along the edge. If so, where T-vertices are permitted, linearly interpolate the new position (according to the piecewise linear function stored in the edge) and output the vertex. Where T-vertices are not permitted, select the point stored in the edge data that is closest to the current vertex location and output that point.

For each edge of the primitive, determine if the corresponding edge data structure contains any data for the open parameter interval covered by this edge, and output the corresponding sequence of vertices in clockwise order.

Figure 6A:
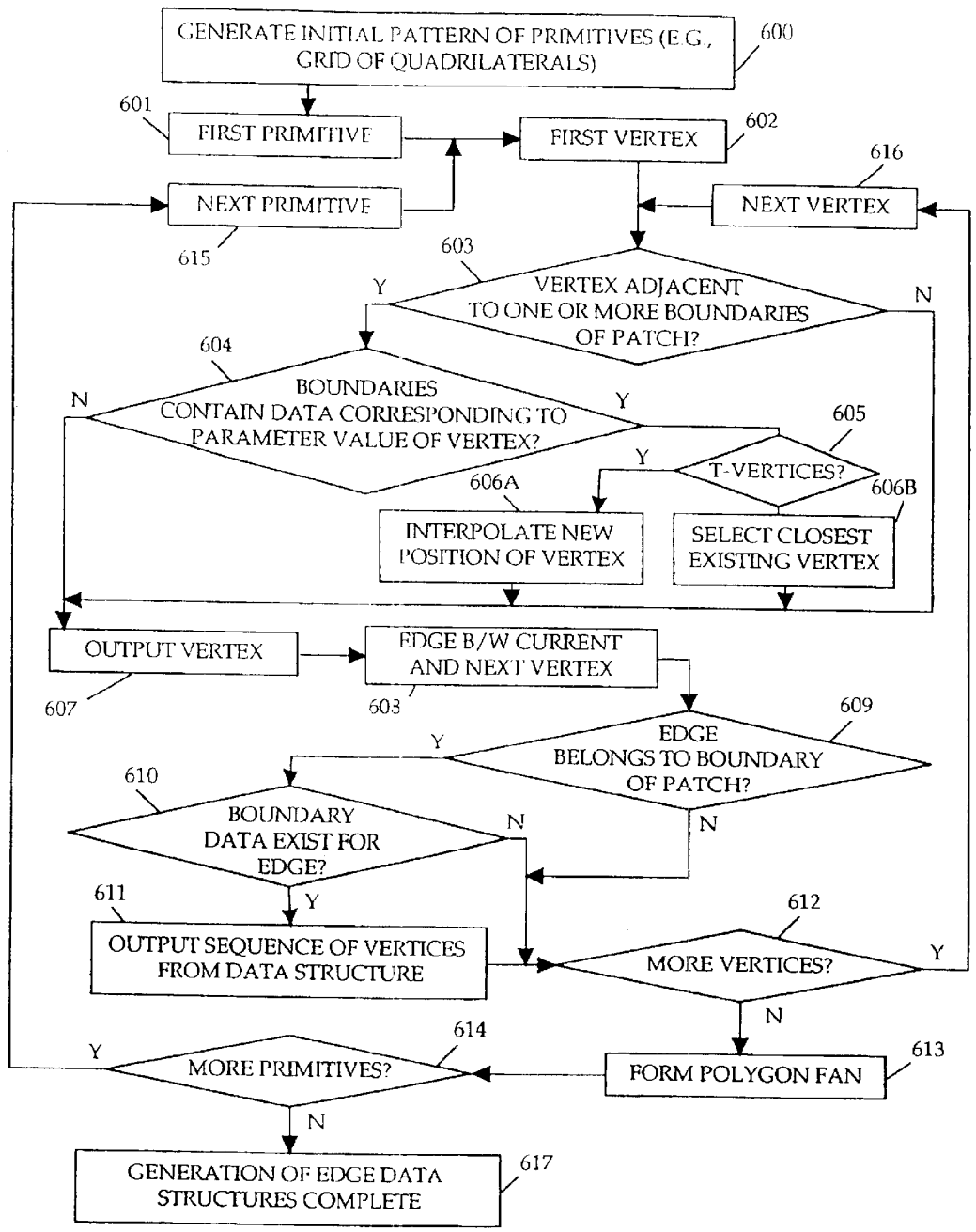
FIGS. 6A–6B are flow diagrams of a tessellation process in accordance with an embodiment of the invention.
Figure 6B:
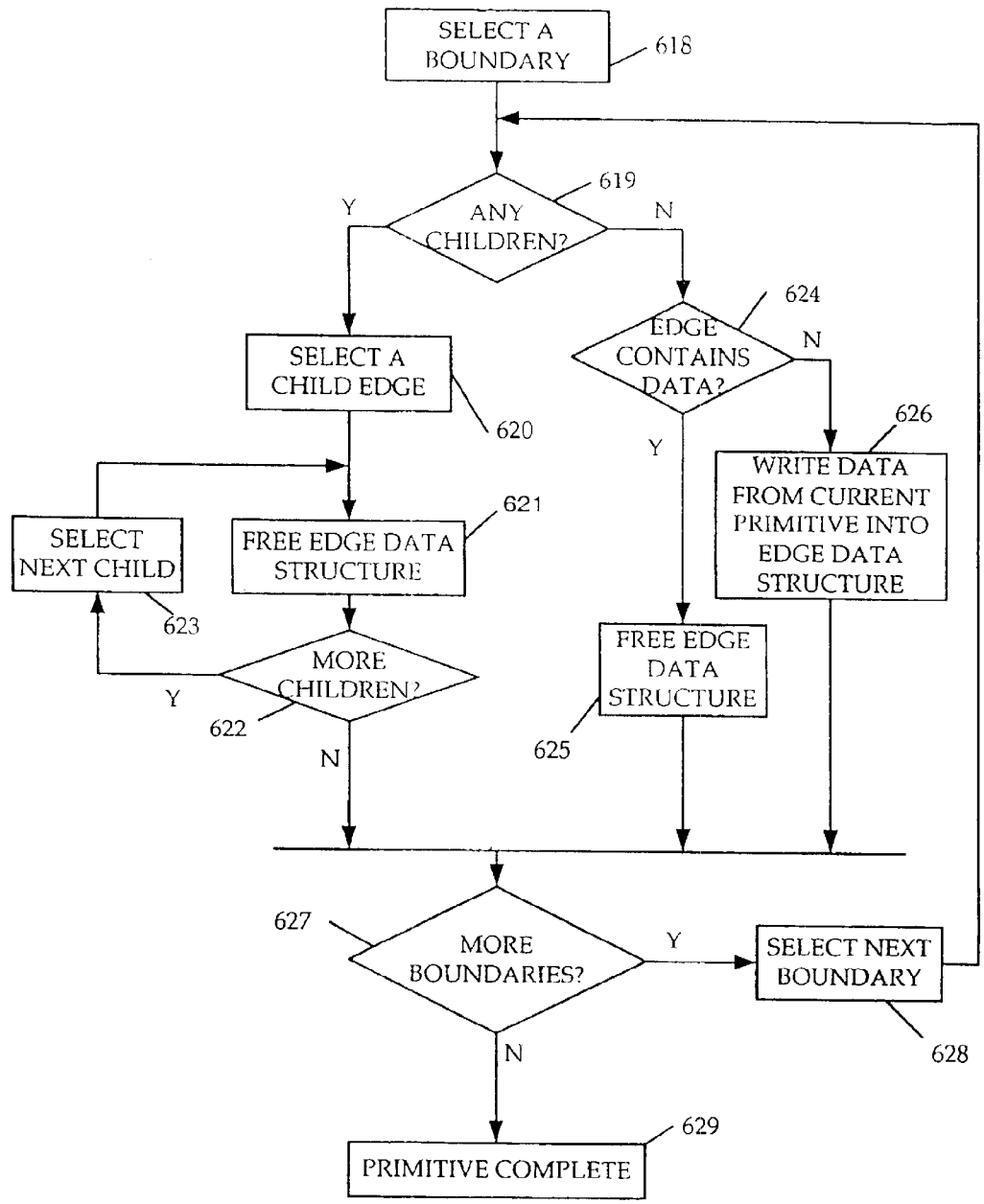

FIG. 6A and 6B are flow diagrams illustrating a tessellation process in accordance with one or more embodiments of the invention. Beginning with FIG. 6A, step 600, an initial pattern of primitives (e.g., a grid of quadrilaterals) is generated across the patch to be tessellated. In step 601, a first primitive is selected from the initial pattern, and, in step 602, a first vertex is selected from the current primitive.

Figure 7:
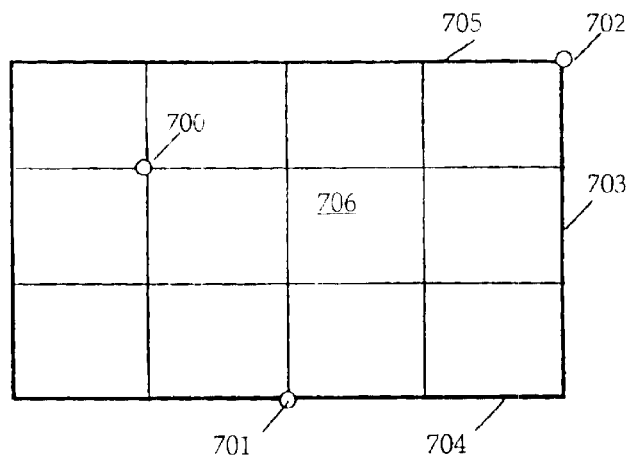
FIG. 7 is a block diagram of a region of a surface having vertices.

In step 603, the current vertex is evaluated to determine whether it is adjacent to one or more boundaries (i.e., edges) of the patch. Referring briefly to FIG. 7, in a pattern of primitives (706), a vertex may be adjacent to zero boundaries, one boundary or two boundaries. For example, vertex 700 is an internal vertex and therefore is not adjacent to any boundaries. Vertex 701, however, is located along one side of the patch, and is thus adjacent to one boundary (704). Vertex 702 is located at the corner of the patch, and is thus adjacent to two boundaries (703 and 705).

Referring back to FIG. 6A, if, in step 603, the current vertex is not adjacent to any boundaries (i.e., is an internal vertex), then the process continues at step 607. However, if the current vertex is adjacent to one or more boundaries of the patch, the process continues at step 604. In step 604, for those boundaries adjacent to the vertex, the associated edge data structures are accessed (via the pointer held by the patch) to determine whether the edge data structures contain data corresponding to the parameter value of the current vertex. If there is corresponding data within the edge data structures, then either step 606A or step 606B is performed, depending upon whether the tessellation implementation permits T-vertices, step 605. If T-vertices are permitted, then in step 606A, a new location is interpolated for the current vertex based upon the piecewise linear function stored as vertex data within the edge data structures. If T-vertices are not permitted, then in step 606B, the current vertex may be relocated to the nearest vertex location stored in the edge data structure. Steps 603, 604 and 606A–B proceed to step 607 in which the current vertex (or vertices) is output.

Note that if the current vertex is adjacent to two edges, the vertex processing of steps 604–607 may be performed separately for both edges. That is, the current vertex may be separately interpolated (or selected) with respect to the data in each data structure, outputting two separate vertex locations in place of the current vertex.

After the vertex is output in step 607, in step 608, the primitive edge between the current vertex and the next vertex is selected for processing. In step 609, the primitive edge is evaluated to determine whether it belongs to a boundary of the patch. If the primitive edge does not belong to a boundary of the patch, the process continues at step 612; otherwise, if the primitive edge is part of the patch boundary, the process continues at step 610. In step 610, if there is no boundary data for the edge data structure associated with the current primitive edge, the process continues at step 612; otherwise, if boundary data does exist, the boundary data is output from the data structure as a sequence of vertices before proceeding to step 612.

In step 612, if there are any remaining vertices in the primitive, the next vertex is selected in step 616, and the process returns to step 603 to process that vertex. If, in step 612, there are no remaining vertices to be processed, then, in step 613, the sequence of vertices output by the tessellation process are used to form a polygon fan (e.g., a triangle or quadrilateral fan). For example, a triangle fan may be generated by selecting an arbitrary root vertex $V_0$ of the vertex sequence and stepping around the sequence of m vertices in a clockwise direction to define triangles $T_k$ with vertices ($V_0$, $V_k$, $V_{k+1}$), for k in the range of 1 to m−2.

In step 614, if there are more primitives to be processed in the initial pattern, in step 615, the next primitive is selected and the process continues at step 602. If, in step 614, all primitives in the initial pattern have been processed, processing continues in FIG. 6B to write the generated data to edge data structures.

FIG. 6B shows how the vertex location and parameter values are written into the edge data structures for each primitive. Only edge data structures that did not have pre-existing data are written to. In step 618, a boundary of the primitive is selected. At step 619, a check is made if the current boundary has children (i.e. if the boundary has child edges then it is an internal node of the binary tree). If the boundary has children, then at step 620, we select a child edge and free the edge data structure at step 621. If at step 622, more child edges have not been processed, then a new child edge is selected at step 623 and processing continues at step 621 until all the children have been processed. However, if at step 619, the boundary has no children (i.e. leaf node), processing continues at step 624 to either write or free data. At step 624, if the edge contains data, then the data structure is freed at step 625, otherwise data from the current primitive is written into the edge data structure at step 626. If more boundaries are available at step 627, the next boundary is selected at step 628 and processing returns to step 619, until all the boundaries of the primitive are processed.

Figure 8A:
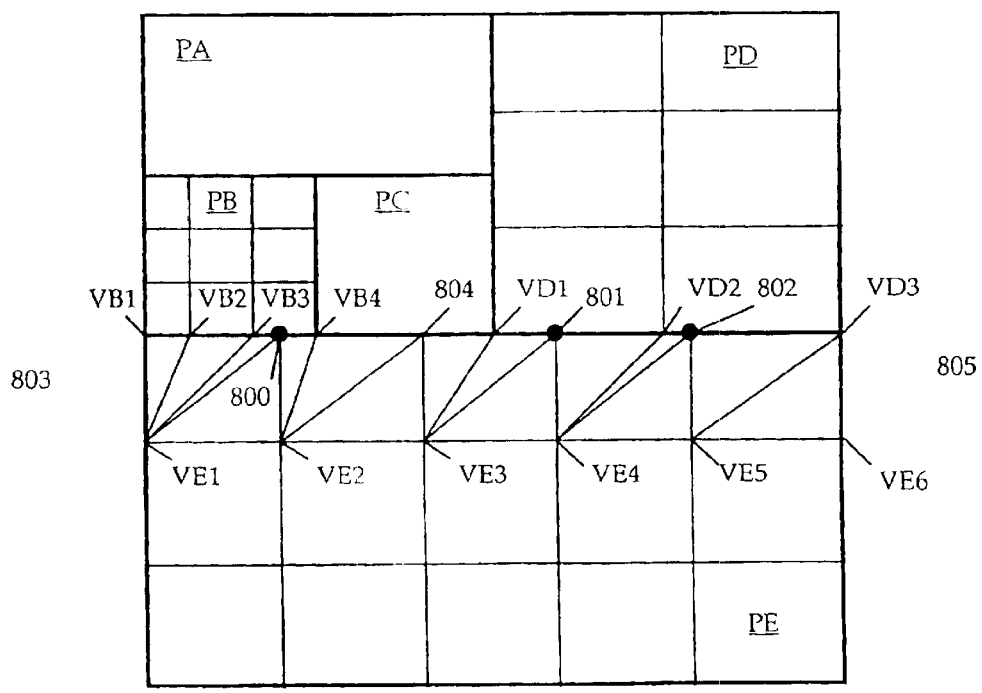
FIG. 8A is a diagram illustrating a tessellation with allowable T-vertices, in accordance with an embodiment of the invention.

FIG. 8A shows how the top row of quadrilaterals from patch PE of FIG. 5C may be tessellated by the previously described tessellation process, assuming T-vertices are permitted. The surface illustrated comprises patches PA–PE, wherein patches PB and PD were previously rendered (as 3×3 and 2×3 quadrilateral grids, respectively). Patch PE has an initial 5×3 quadrilateral grid pattern. The initial tessellation pattern of patch PE introduces new vertex 800 along edge 803, which already comprises vertex positions stored as boundary data in the edge data structure for patch PB. The location of Vertex 800 is interpolated from the pre-existing edge data such that no cracks are formed. Vertex 804 is introduced along the edge with patch PC. However, since patch PC is unrendered, vertex 804 is placed according to the position computed when dicing patch PE (and written into the associated edge data structure). Vertices 801 and 802 are introduced along edge 805 shared with patch PD. Vertices 801 and 802 are thus at interpolated locations with respect to the pre-existing boundary data.

For purposes of generating a triangle fan for each top row primitive of patch PE, the lower left vertex is selected as the root vertex for the fan (selecting other vertices of the initial primitive as the root vertex may create nearly degenerate triangles, but this is not problematic. For the top row of primitives, the lower vertices are ordered as VE1–VE6. The bottom vertices of patch PB are ordered VB1–VB4, and the bottom vertices of patch PD are ordered VD1–VD3. For the top-left primitive of patch PE, the triangle fan comprises triangles having the following sets of vertices (VE1, VB1, VB2), (VE1, VB2, VB3), (VE1, VB3, V(800)) and (VE1, V(800), VE2), where V(800) is the interpolated location of vertex 800. As illustrated, the second and third vertices of each triangle are obtained by progressing sequentially around the initial primitive, utilizing pre-existing vertex data obtained from edge data structures where available.

Similarly, the triangle fan rooted at vertex VE2 comprises sets of vertices (VE2, V(800), VB4), (VE2, VB4, 804), (VE2, 804, VE3); the triangle fan rooted at vertex VE3 comprises (VE3, 804, VD1), (VE3, VD1, V(801)), (VE3, V(801), VE4); the triangle fan rooted at vertex VE4 comprises (VE4, V(801), VD2), (VE4, VD2, V(802)), (VE4, V(802), VE5); and the triangle fan rooted at vertex VE5 comprises (VE5, V(802), VD3), (VE5, VD3, VE6).

As previously indicated, the tessellation method can be modified to avoid generating T-vertices at all. Generally, instead of interpolating vertex positions based on pre-existing vertex data, the method returns one of the existing vertices. In one embodiment, the vertex returned is the one that is closest to the desired result. For example, to interpolate between two pre-existing vertices X and Y according to a parameter u, the tessellation method returns X if u<0.5 and Y otherwise. This technique will never generate T-vertices and will always generate tessellation that is topologically continuous. Sometimes degenerate triangles will be generated that can simply be discarded.

Figure 8B:
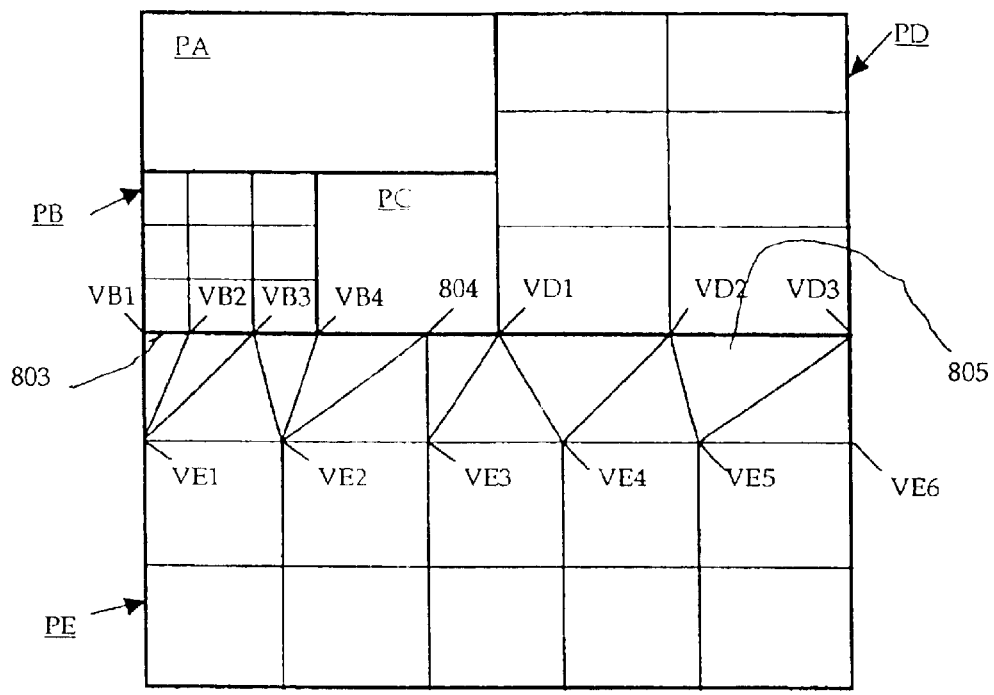
FIG. 8B is a diagram illustrating a tessellation without T-vertices, in accordance with an embodiment of the invention.

FIG. 8B shows how the top row of primitives of patch PE in FIG. 5C might be rendered if T-vertices are not permitted during tessellation. As described, vertices introduced along an edge where pre-existing data has already been written by a previously rendered patch are relocated to one of the pre-existing vertex locations (e.g., the nearest location). In this example, vertex 800 is mapped to the vertex position corresponding to vertex VB3 along edge 803, vertex 804 remains as placed (there is no pre-existing edge data from patch PC), and vertices 801 and 802 are mapped to vertex positions VD1 and VD2, respectively, along edge 805.

The resulting triangle fans are:

(VE1, VB1, VB2), (VE1, VB2, VB3), (VE1, VB3, VE2)

(VE2, VB3, VB4), (VE2, VB4, 804), (VE2, 804, VE3)

(VE3, 804, VD1), (VE3, VD1, VE4)

(VE4, VD1, VD2), (VE4, VD2, VE5)

(VE5, VD2, VD3), (VE5, VD3, VE6)

Figure 8C:
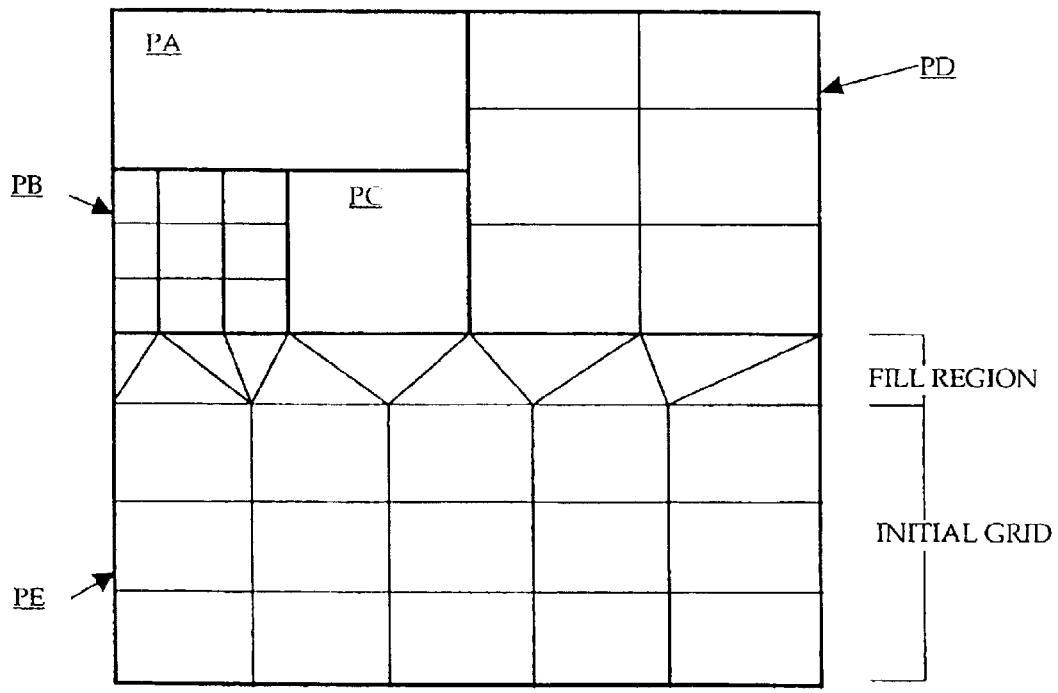
FIG. 8C is a diagram illustrating a tessellation without T-vertices, in accordance with another embodiment of the invention.

Another variation of the tessellation method, illustrated in FIG. 8C, may be used to avoid T-vertices. In this variation, the initial tessellation pattern or grid is placed within the patch, allowing a "fill" region of nearly degenerate triangles to remain between the initial grid and the edge. Where pre-existing edge data exists, the fill region between the initial grid and the specified edge data is filled with a set of almost degenerate triangles. In FIG. 8C these triangles are considerably enlarged for explanatory purposes. Where pre-existing edge data does not exist, the edge vertices of the grid pattern are written into the appropriate edge data structure. This technique has the advantage of allowing both sides to be shaded and rendered as regular grids, and, furthermore, the resulting tessellation does not depend on the order in which the patches are rendered. This property is desirable for computing animations, in which it is important to have consistent rendering results from frame to frame. However, this method can generate a substantial number of degenerate triangles whose influence on the final image is quite small.

The tessellation method (and variations thereof) previously described is advantageous in that it correctly handles displacement mapping. Displacement mapping can cause different patches to compute different positions for a shared vertex. For example, if a corner vertex is shared among four patches, it is possible that the four patches will compute four different positions for that vertex. If this situation is not handled correctly, there will be a hole in the resulting tessellation that may result, for example, in visually undesirable "pinprick" rendering errors in the final rendered image.

Figure 9A:
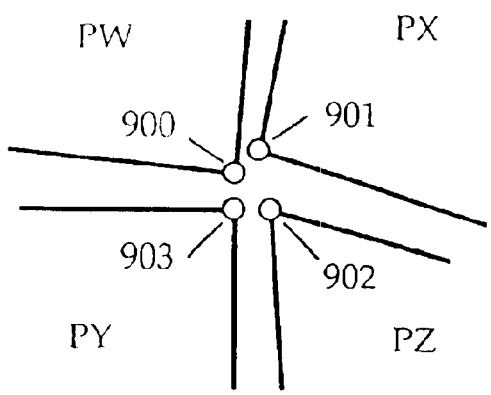
FIGS. 9A–9C are diagrams illustrating the seamless tessellation of four patches having different vertex locations for adjacent corners.
Figure 9B:
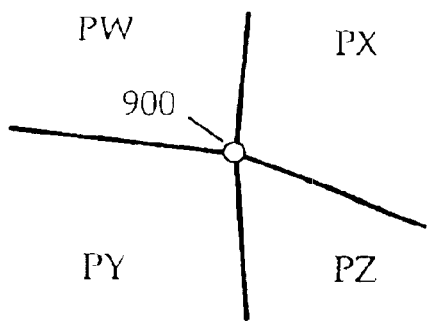
Figure 9C:
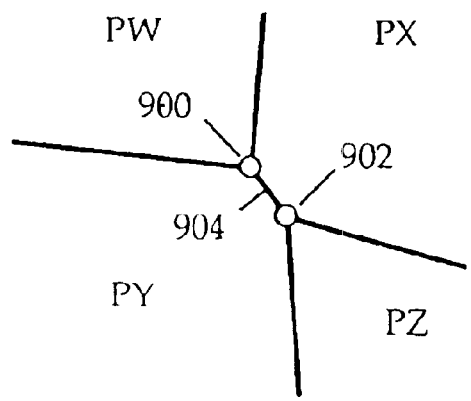

FIGS. 9A–9C illustrate how embodiments of the invention prevent such holes from occurring during tessellation. FIG. 9A shows a common corner vertex for four different patches PW, PX, PY and PZ. Using displacement mapping, the corner vertex maps to four different locations, shown as vertices 900, 901, 902 and 903 for patches PW, PX, PZ and PY, respectively. This situation is handled automatically by embodiments of the invention due to the propagation of edge endpoints between adjacent patches.

For any rendering order wherein the patch currently being rendered is adjacent along an edge to a patch that has already been rendered, the corner vertex location corresponding to the first rendered patch will be propagated to all of the other patches. This case is illustrated in FIG. 9B. If the patches are rendered in the order of patch PW followed by either patch PX or patch PY, the corner position 900 computed for patch PW will be propagated to all four adjacent patches, ensuring a continuous tessellation.

For any rendering order wherein opposing (i.e. sharing only a common vertex rather than an edge) patches are rendered first, followed by the remaining patches, two corner vertices may be determined. This is illustrated in FIG. 9C, wherein rendering of patch PW followed by patch PZ (or vice versa) results in the storing of vertex 900 for the left edge of patch PX and the top edge of patch PY, and the storing of vertex 902 for the right edge of patch PY and the bottom edge of patch PX. However, when processing a vertex for which the two adjacent edges contain different data, the tessellation method interpolates and outputs both corresponding vertex positions. When patches PX and PY are rendered, both of vertex positions 900 and 902 will be inserted into the sequence of vertices determining their respective triangle fans. This creates a continuous tessellation as the seam 904 between vertices 900 and 902 is shared by triangles of patches PX and PY.

Embodiments of the invention may be applied to surfaces of arbitrary topology. This is achieved by associating an orientation flag (Boolean) with each edge pointer in a patch to indicate the orientation of the edge relative to the patch. The flag is TRUE if edge parameterization increases in the counter-clockwise direction around the patch, and FALSE otherwise. This feature allows each patch to have its own local parameterization, while still being able to determine a consistent mapping from the boundary data of the patch to its representation in the StitchEdge data structure. This allows embodiments of the invention to function on surfaces where a (u, v) parameterization is not available, including the ability to "stitch together" several independently modeled geometric primitives. In the usual case where two adjacent patches have surface normals that face the same way, the only requirement is that the orientation flag should be FALSE for the edge pointer in one patch and TRUE in the other. (A non-orientable surface such as a Mobius strip would be an exception to this rule, since two patches that are adjacent across the "seam" have normals that point in opposite directions.)

Overlapping Technique for T-Vertices

The following is a description of how T-vertices may be rendered without cracks in accordance with one or more embodiments of the invention. The method previously described for tessellating with T-vertices eliminates all cracking due to differing dicing rates, displacement, and numerical errors during evaluation. However, because floating point numbers have finite precision, there may still be very tiny cracks in the resulting tessellation. This happens because when a vertex is linearly interpolated along an existing edge, the resulting position is rarely exactly on the edge. Rather, the resulting position is usually slightly to one side or the other due to the limits of the floating point representation. If the interpolated position happens to be on the "wrong" side, there will be a hairline crack between the existing edge of the adjacent patch and the edges connected to the interpolated vertex of the current patch. It is possible for samples to fall through these cracks.

To avoid this problem, the interpolation step is implemented in a manner to ensure that there is always a small overlap across the existing edge rather than a crack. The error introduced by a crack may be several hundred percent over the ideal color value for a pixel (depending on the pixel sampling technique employed), whereas there will be no rendering error if the corresponding surfaces are opaque, and only a very small error (a few percent) if the surfaces are partially transparent. This technique works best if the point of view (i.e. the camera transformation) is known in advance, in which case cracking becomes a two-dimensional interpolation problem. Two different variations for performing the interpolation will be described with respect to FIGS. 10A and 10B.

Figure 10A:
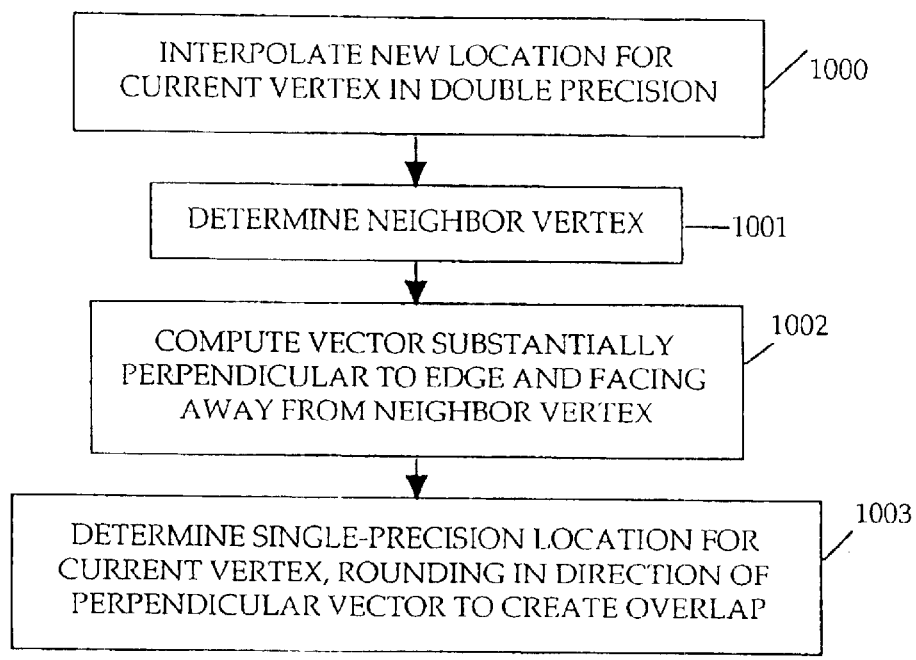
FIGS. 10A–10B are flow diagrams of processes for interpolating vertex locations in accordance with one or more embodiments of the invention.

The technique shown in FIG. 10A is generally based on first interpolating the corner vertex in double precision, and then choosing one of the four adjacent (x, y) points in the single-precision lattice. It will be apparent that some of the steps described may be performed in different order or in parallel. In step 1000, using double precision arithmetic, a new location for the current vertex is interpolated from the pre-existing edge data. In step 1001, the process locates a neighboring vertex from the current prinmitive (e.g., quadrilateral) being rendered. In step 1002, a vector is computed that is substantially perpendicular to the current edge, and faces away from the neighboring vertex. Rounding in the direction of the calculated vector (and thus away from the interior of the quadrilateral), a single precision location for the current vertex is then determined in step 1003.

Figure 11A:
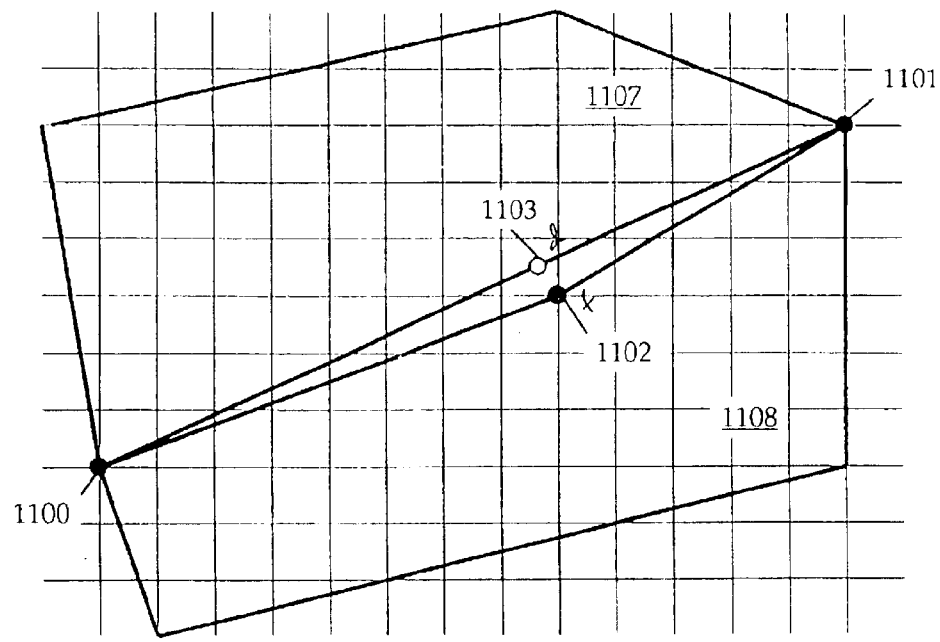
FIGS. 11A–11C are diagrams illustrating interpolation of a vertex location to achieve an overlap in the presence of T-vertices, in accordance with an embodiment of the invention.
Figure 11B:
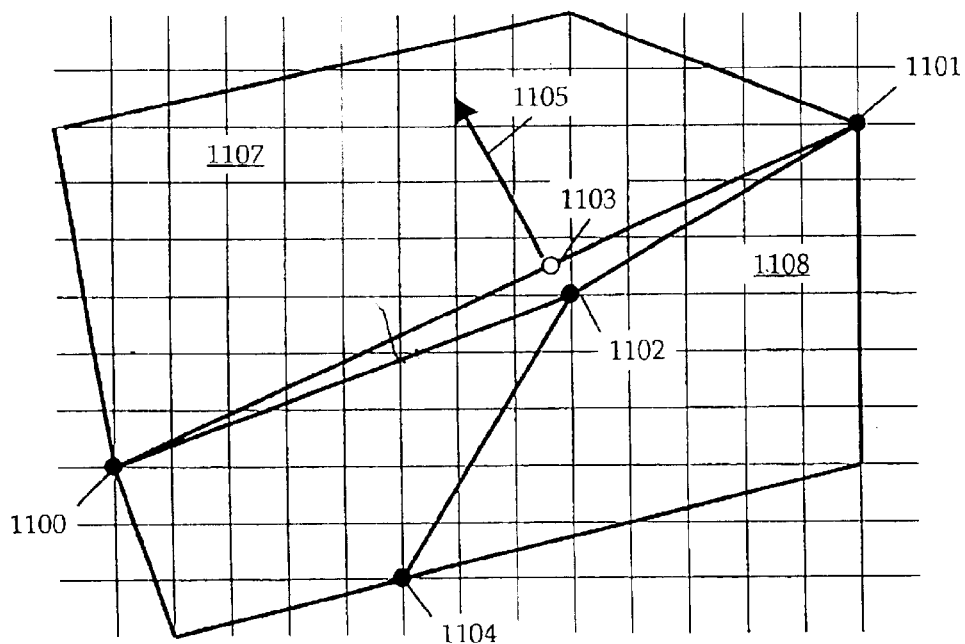
Figure 11C:
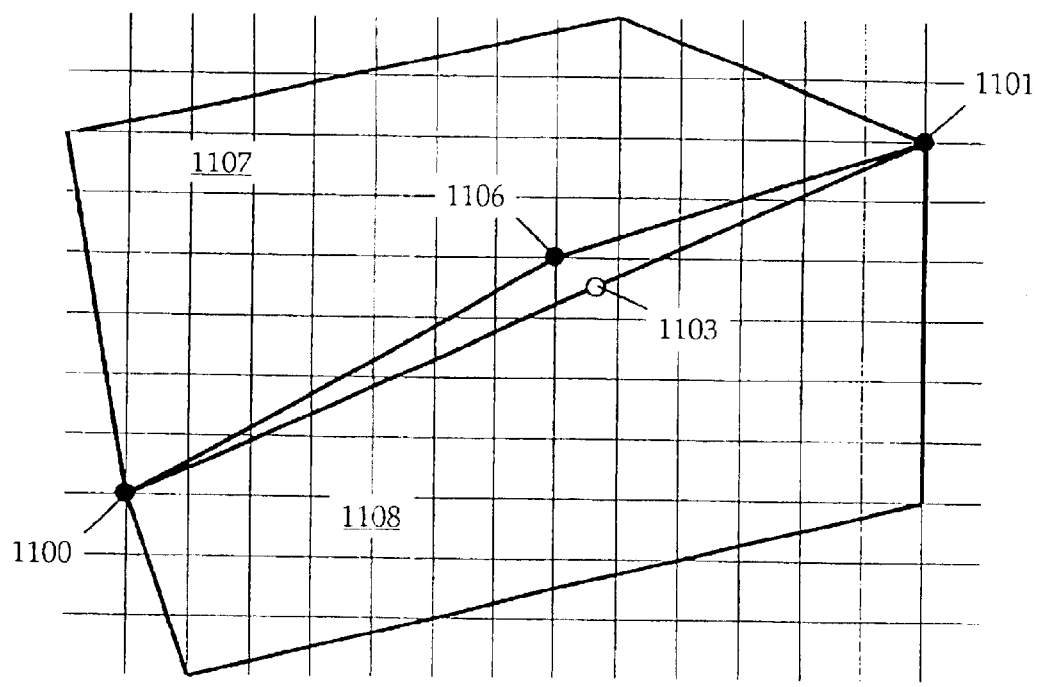

The method of FIG. 10A is graphically illustrated in FIGS. 11A–11C. Region 1107 represents the adjacent patch having pre-existing edge vertices 1100 and 1101 stored in the adjacent edge data structure. Region 1108 represents the patch currently being rendered. Let $(d_x, d_y)$ be the double-precision interpolated vertex position (where 1103 represents the ideal interpolated position), and let $(f_x, f_y)$ represent the position 1102 after rounding to single precision. As shown in FIG. 11B, $(r_x, r_y)$ is computed, representing the vector 1105 perpendicular to the edge defined by vertices 1100 and 1101, and facing away from a given neighboring vertex 1104 of patch 1108. The x and y components of the vertex position 1102 are adjusted separately to ensure that those components are rounded in the direction given by vector 1105 $(r_x, r_y)$. The resulting vertex location after rounding adjustment is shown as vertex 1106 in FIG. 11C, which resides just inside the adjacent patch 1107, forming the desired overlap.

An example code implementation for this rounding technique is provided below, using the "NextAfter" function. NextAfter(x, d) is a function that returns the next representable floating-point number after "x" in the direction "d," similar to the ANSI intrinsic function "nextafter".

if (rx>0) {if (fx<dx) fx=NextAfter (fx, 1);}
else {if (fx>dx) fx=NextAfter (fx, −1); }
if (ry>0) {if (fy<dy) fy=NextAfter (fy, 1);}
else {if (fy>dy) fy=NextAfter (fy, −1);}

The second technique for rendering T-vertices does not require double-precision arithmetic. The general technique is to determine an upper bound on how far the interpolated position is from the actual edge (i.e. how "wide" the crack might be), for example, using properties of IEEE floating-point arithmetic. The basic steps of this technique are shown in FIG. 10B.

Figure 10B:
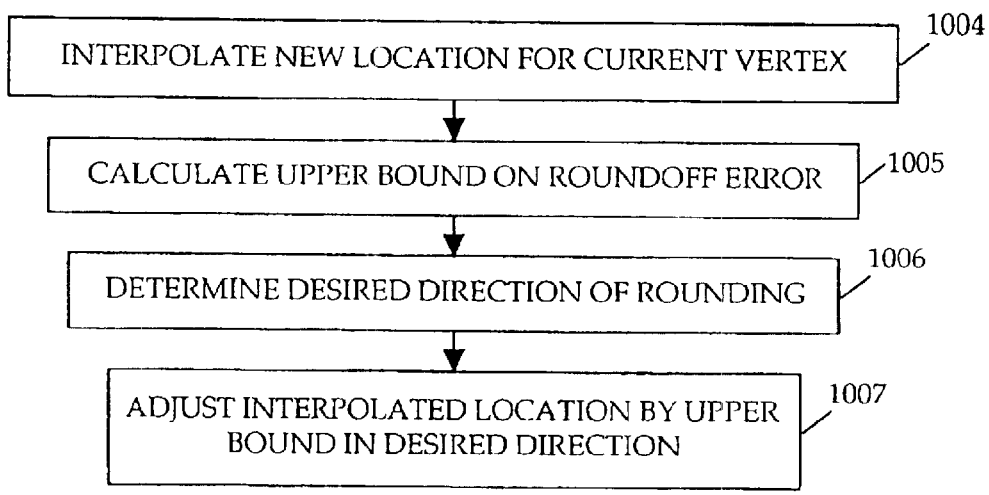

In step 1004 of FIG. 10B, a new location for the current vertex is interpolated from the pre-existing edge data (e.g., vertices 1100 and 1101), and an upper bound on the roundoff error is determined in step 1005. In step 1006, the process determines the desired direction of rounding to achieve an overlapping edge (similar to the process of FIG. 10A). Finally, in step 1007, the interpolated vertex location is adjusted in the desired direction by the specified upper bound on the roundoff error.

If x and y are normalized single-precision numbers, and Δ denotes a binary operation (addition, multiplication, etc.), the IEEE specification guarantees that $$fl[x\Delta y]=(1+\epsilon)(x\Delta y)$$

where fl[xΔy] is the result of the floating-point operation xΔy, and $|\epsilon|<\mu$ where $\mu$ is the unit round-off (equal to $2^{-24}$ in single precision arithmetic). In other words, a single arithmetic operation has a relative error of at most $\mu=2^{-24}$. This can be used to calculate an upper bound on roundoff error in the interpolation calculation.

The interpolation equations for the x and y components (i.e., (fx, fy)) of the current vertex location for a given parameter value "u" are as follows:

$$fx=((1-f)*X0)+(f*X1);$$

$$fy=((1-f)*Y0)+(f*Y1);$$

where (X0, Y0) and (X1, Y1) are the coordinates of the pre-existing edge vertices used to interpolate. "f" is calculated from the parameter values U0 and U1, respectively, of the pre-existing edge vertices and the "u" parameter value of the current vertex as:

$$f=1-(U1-u)/(U1-U0)$$

The upper bound (Rx) on the roundoff error for interpolating fx (and similarly for fy) may be calculated by multiplying $\mu$ times the absolute value of the result of each arithmetic operation, and summing the resulting terms, as shown below:

$$Rx=\mu*(|(1-f)*X0|+|f*X1|+|fx|+|fx|)$$

where the last term |fx| accounts for the error in the final rounding adjustment wherein Rx is added or subtracted from fx (see below). Other mechanisms may also be used to determine an upper bound on the roundoff error.

Using the upper bound Rx determined above, and a similarly determined upper bound Ry, the vertex location is adjusted in the x and y directions by the magnitude of Rx and Ry, respectively. The direction of the adjustment is based upon the direction of vector (rx, ry).

A software code implementation of the above technique is provided below in the C programming language.

```
/*  p[0] and p[1] are the points to be interpolated, at the parameter value
    "u".
    The calculation below ensures that 1−f is representable, so that
    f + (1−f) == 1 exactly. */
f = 1 − (p[1].u − u) / (p[1].u − p[0].u);
```

-continued

```
/* Do the interpolation, saving intermediate results. */
fx = (fx1 = (1-f) * p[0].pos.x) + (fx2 = f * p[1].pos.x);
fy = (fy1 = (1-f) * p[0].pos.y) + (fy2 = f * p[1].pos.y);
/*   The error in computing fx can be bounded by summing ROUNDOFF
     times the absolute value of the result of each arithmetic operation.
     Thus to obtain the desired direction of rounding, we must add or
     subtract ROUNDOFF * (fabs(fx1) + fabs(fx2) + 2 * fabs (fx)), where
     the last fabs (fx) accounts for the (fx + rx) operation below.
     (Note that if fx1 and fx2 have the same sign, the calculation
     simplifies to 3 * ROUNDOFF * fabs (fx).) */
rx= ROUNDOFF * (fabs(fx1) + fabs(fx2) + 2 * fabs(fx));
ry= ROUNDOFF * (fabs(fy1) + fabs(fy2) + 2 * fabs(fy));
/*   (rx, ry) gives the desired direction of rounding */
if (rx < 0) { rx = -rx; }
if (ry < 0) { ry = -ry; }
/*   Adjust the final vertex position to avoid cracks */
x = fx + rx;
y = fy + ry;
```

Extension to Trim Curves and Stitching of Independent Surfaces

The methods described in the foregoing specification may also be extended to handle trim curves. In this case, separate binary trees are maintained that represent the splits on each side of a trim curve. A single split may divide the curve into multiple pieces, but this can still be represented by multiple branches of the binary tree. As patches adjacent to each trim curve are rendered, data is copied from one binary tree to the other. Splits in one tree are propagated to the other, so that the endpoints of each trim curve segment can be represented correctly.

Embodiments of the invention may also be used to stitch together independently modeled surfaces into a single seamlessly rendered surface. To accomplish this stitching, one or more edge data structures as described herein are assigned along the edge or boundary where the independent surfaces are to be fused together. Thus, when one surface is rendered, the edge data along the boundary with the adjacent (and previously independent) surface is stored for use in rendering the adjacent surface. Tessellation along the fused seam is accomplished without cracks, as if the two surfaces are merely patches or regions of a single surface.

Computer Execution Environment (Hardware)

An embodiment of the invention can be implemented as computer software in the form of computer readable code executed on a general-purpose computer. Also, one or more elements of the invention may be embodied in hardware configured for such a purpose, e.g., as one or more functions of a graphics hardware system.

Figure 12:
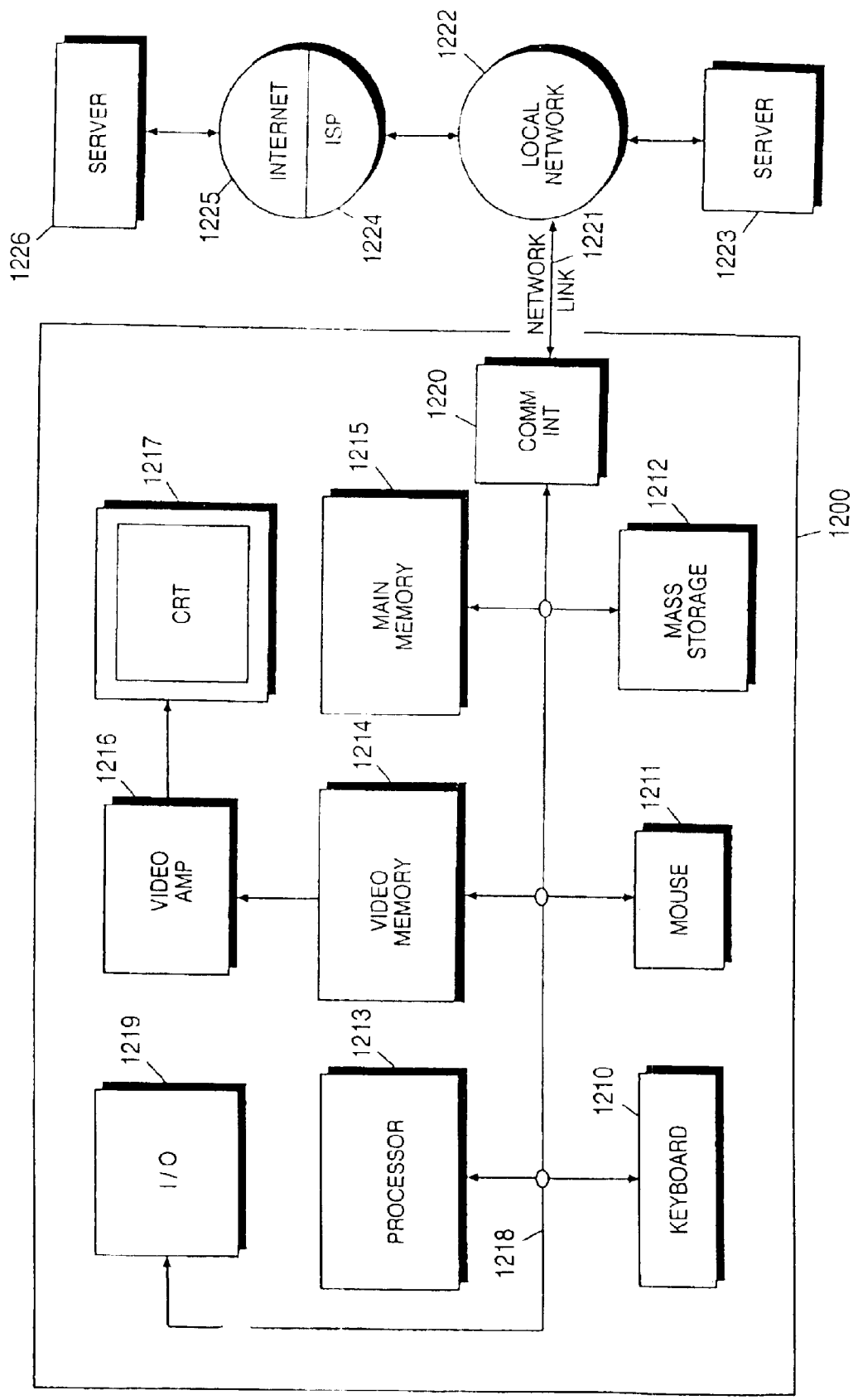
FIG. 12 is a block diagram of a computer execution environment wherein one or more embodiments of the invention may be implemented.

An example of a general-purpose computer 1200 is illustrated in FIG. 12. A keyboard 1210 and mouse 1211 are coupled to a bi-directional system bus 1218. The keyboard and mouse are for introducing user input to the computer system and communicating that user input to processor 1213. Other suitable input devices may be used in addition to, or in place of, the mouse 1211 and keyboard 1210. I/O (input/output) unit 1219 coupled to bidirectional system bus 1218 represents such I/O elements as a printer, A/V (audio/video) I/O, etc.

Computer 1200 includes video memory 1214, main memory 1215 and mass storage 1212, all coupled to bidirectional system bus 1218 along with keyboard 1210, mouse 1211 and processor 1213. The mass storage 1212 may include both fixed and removable media, such as magnetic, optical or magneto-optical storage systems or any other available mass storage technology. Bus 1218 may contain, for example, thirty-two address lines for addressing video memory 1214 or main memory 1215. The system bus 1218 also includes, for example, a 64-bit data bus for transferring data between and among the components, such as processor 1213, main memory 1215, video memory 1214 and mass storage 1212. Alternatively, multiplex data/address lines may be used instead of separate data and address lines.

In one embodiment of the invention, the processor 1213 is a microprocessor manufactured by Motorola, such as one of the PowerPC family of processors, or a microprocessor manufactured by Intel, such as the 80X86, or Pentium family of processors, or a SPARC™ microprocessor from Sun Microsystems™, Inc. However, any other suitable microprocessor or microcomputer may be utilized. Main memory 1215 is comprised of dynamic random access memory (DRAM). Video memory 1214 may be, for example, a dual-ported video random access memory. One port of the video memory 1214 is coupled to video amplifier 1216. The video amplifier 1216 is used to drive the cathode ray tube (CRT) raster monitor 1217. Video amplifier 1216 is well known in the art and may be implemented by any suitable apparatus. This circuitry converts pixel data stored in video memory 1214 to a raster signal suitable for use by monitor 1217. Monitor 1217 is a type of monitor suitable for displaying graphic images. Alternatively, the video memory could be used to drive a flat panel or liquid crystal display (LCD), or any other suitable data presentation device.

Computer 1200 may also include a communication interface 1220 coupled to bus 1218. Communication interface 1220 provides a two-way data communication coupling via a network link 1221 to a local network 1222. For example, if communication interface 1220 is an integrated services digital network (ISDN) card or a modem, communication interface 1220 provides a data communication connection to the corresponding type of telephone line, which comprises part of network link 1221. If communication interface 1220 is a local area network (LAN) card, communication interface 1220 provides a data communication connection via network link 1221 to a compatible LAN. Communication interface 1220 could also be a cable modem or wireless interface. In any such implementation, communication interface 1220 sends and receives electrical, electromagnetic or optical signals which carry digital data streams representing various types of information.

Network link 1221 typically provides data communication through one or more networks to other data devices. For example, network link 1221 may provide a connection through local network 1222 to local server computer 1223 or to data equipment operated by an Internet Service Provider (ISP) 1224. ISP 1224 in turn provides data communication services through the world wide packet data communication network now commonly referred to as the "Internet" 1225. Local network 1222 and Internet 1225 both use electrical, electromagnetic or optical signals which carry digital data streams. The signals through the various networks and the signals on network link 1221 and through communication interface 1220, which carry the digital data to and from computer 1200, are exemplary forms of carrier waves transporting the information.

Computer 1200 can send messages and receive data, including program code, through the network(s), network link 1221, and communication interface 1220. In the Internet example, remote server computer 1226 might transmit a requested code for an application program through Internet 1225, ISP 1224, local network 1222 and communication interface 1220.

The received code may be executed by processor 1213 as it is received, and/or stored in mass storage 1212, or other non-volatile storage for later execution. In this manner, computer 1200 may obtain application code in the form of a carrier wave.

Application code may be embodied in any form of computer program product. A computer program product comprises a medium configured to store or transport computer readable code or data, or in which computer readable code or data may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

Thus, a method and apparatus for surface approximation without cracks have been described in conjunction with one or more specific embodiments. The invention is defined by the claims and their full scope of equivalents.

What is claimed is:

1. In a computer system, a method comprising:
   splitting a surface into a first region and a second region, said first region and said second region having a common edge;
   obtaining a data structure associated with said common edge;
   tessellating said first region, comprising writing adjacency information associated with said common edge to said data structure; and
   tessellating said second region independently of said first region, comprising reading said adjacency information from said data structure to form a tessellation without cracks along said common edge;
   wherein writing adjacency information comprises writing vertex locations along said common edge into said data structure;
   wherein tessellating said second region comprises:
      obtaining said vertex locations from said data structure;
      determining one or more selected vertex locations along said common edge, said selected vertex locations comprising said vertex locations obtained from said data structure;
   wherein determining one or more selected vertex locations further comprises interpolating one or more vertex locations based on said vertex locations obtained from said data structure;
   wherein interpolating one or more vertex locations forms an overlap of said second region over said first region at said one or more vertex locations;
   wherein interpolating one or more vertex locations comprises:
      interpolating a double precision vertex location;
      determining a vector pointing away from a neighboring vertex in said second region;
      obtaining a single precision vertex location by rounding said double precision location in direction of said vector.

2. The method of claim 1, wherein determining one or more selected vertex locations further comprises:
   identifying one or more initial locations on said common edge;
   for said one or more initial locations along said common edge, selecting a closest vertex location from said vertex locations obtained from said data structure.

3. The method of claim 1, wherein tessellating said second region further comprises:
   determining an initial grid of vertex locations in said second region, wherein a fill region exists between a grid edge of said initial grid and said common edge; and
   tessellating said fill region using vertex locations of said grid edge and said one or more selected vertex locations.

4. The method of claim 1, wherein tessellating said second region further comprises freeing said data structure.

5. In a computer system, a method comprising:
   splitting a surface into a first region and a second region, said first region and said second region having a common edge;
   obtaining a data structure associated with said common edge;
   tessellating said first region, comprising writing adjacency information associated with said common edge to said data structure; and
   tessellating said second region independently of said first region, comprising reading said adjacency information from said data structure to form a tessellation without cracks along said common edge;
   wherein writing adjacency information comprises writing vertex locations along said common edge into said data structure;
   wherein tessellating said second region comprises:
      obtaining said vertex locations from said data structure;
      determining one or more selected vertex locations along said common edge, said selected vertex locations comprising said vertex locations obtained from said data structure;
   wherein determining one or more selected vertex locations further comprises interpolating one or more vertex locations based on said vertex locations obtained from said data structure;
   wherein interpolating one or more vertex locations forms an overlap of said second region over said first region at said one or more vertex locations;
   wherein interpolating one or more vertex locations comprises:
      interpolating an initial vertex location;
      determining an upper bound on roundoff error;
      determining a desired direction of rounding; and
      adjusting said initial vertex location by said upper bound in said desired direction.

6. The method of claim 5, wherein said desired direction is substantially perpendicular to said common edge and pointing away from said second region.

7. The method of claim 5, wherein determining one or more selected vertex locations further comprises:
   identifying one or more initial locations on said common edge;
   for said one or more initial locations along said common edge, selecting a closest vertex location from said vertex locations obtained from said data structure.

8. The method of claim 5, wherein tessellating said second region further comprises:
   determining an initial grid of vertex locations in said second region, wherein a fill region exists between a grid edge of said initial grid and said common edge; and
   tessellating said fill region using vertex locations of said grid edge and said one or more selected vertex locations.

9. The method of claim 5, wherein tessellating said second region further comprises freeing said data structure.

10. A computer program product comprising:
a computer readable medium having computer program code embodied therein for rendering surfaces, the computer readable medium comprising computer program code configured to cause a computer to:
split a surface into a first region and a second region, said first region and said second region having a common edge;
obtain a data structure associated with said common edge;
tessellate said first region;
write adjacency information of said first region to said data structure, wherein said adjacency information is associated with said common edge; and
tessellate said second region independently of said first region, said tessellation of said second region comprising reading said adjacency information from said data structure to form a tessellation without cracks along said common edge;
wherein writing adjacency information comprises writing vertex locations along said common edge into said data structure;
wherein tessellating said second region comprises:
obtaining said vertex locations from said data structure;
determining one or more selected vertex locations along said common edge, said selected vertex locations comprising said vertex locations obtained from said data structure;
wherein determining one or more selected vertex locations further comprises interpolating one or more vertex locations based on said vertex locations obtained from said data structure;
wherein interpolating one or more vertex locations forms an overlap of said second region over said first region at said one or more vertex locations;
wherein interpolating one or more vertex locations comprises:
interpolating a double precision vertex location;
determining a vector pointing away from a neighboring vertex in said second region;
obtaining a single precision vertex location by rounding said double precision location in direction of said vector.

11. The computer program product of claim 10, wherein determining one or more selected vertex locations further comprises:
identifying one or more initial locations on said common edge;
for said one or more initial locations along said common edge, selecting a closest vertex location from said vertex locations obtained from said data structure.

12. The computer program product of claim 10, wherein tessellating said second region further comprises:
determining an initial grid of vertex locations in said second region, wherein a fill region exists between a grid edge of said initial grid and said common edge; and
tessellating said fill region using vertex locations of said grid edge and said one or more selected vertex locations.

13. The computer program product of claim 10, wherein tessellating said second region further comprises freeing said data structure.

14. A computer program product comprising:
a computer readable medium having computer program code embodied therein for rendering surfaces, the computer readable medium comprising computer program code configured to cause a computer to:
split a surface into a first region and a second region, said first region and said second region having a common edge;
obtain a data structure associated with said common edge;
tessellate said first region;
write adjacency information of said first region to said data structure, wherein said adjacency information is associated with said common edge; and
tessellate said second region independently of said first region, said tessellation of said second region comprising reading said adjacency information from said data structure to form a tessellation without cracks along said common edge;
wherein writing adjacency information comprises writing vertex locations along said common edge into said data structure;
wherein tessellating said second region comprises:
obtaining said vertex locations from said data structure;
determining one or more selected vertex locations along said common edge, said selected vertex locations comprising said vertex locations obtained from said data structure;
wherein determining one or more selected vertex locations further comprises interpolating one or more vertex locations based on said vertex locations obtained from said data structure;
wherein interpolating one or more vertex locations forms an overlap of said second region over said first region at said one or more vertex locations;
wherein interpolating one or more vertex locations comprises:
interpolating an initial vertex location;
determining an upper bound on roundoff error;
determining a desired direction of rounding; and
adjusting said initial vertex location by said upper bound in said desired direction.

15. The computer program product of claim 14, wherein said desired direction is substantially perpendicular to said common edge and pointing away from said second region.

16. The computer program product of claim 14, wherein determining one or more selected vertex locations further comprises:
identifying one or more initial locations on said common edge;
for said one or more initial locations along said common edge, selecting a closest vertex location from said vertex locations obtained from said data structure.

17. The computer program product of claim 14, wherein tessellating said second region further comprises:
determining an initial grid of vertex locations in said second region, wherein a fill region exists between a grid edge of said initial grid and said common edge; and
tessellating said fill region using vertex locations of said grid edge and said one or more selected vertex locations.

18. The computer program product of claim 14, wherein tessellating said second region further comprises freeing said data structure.

* * * * *